(12) United States Patent
Nikain et al.

(10) Patent No.: US 11,212,185 B2
(45) Date of Patent: Dec. 28, 2021

(54) SYSTEMS AND METHODS FOR ENHANCED INTENT-BASED SELF CONFIGURATION OF VIRTUAL NETWORK FUNCTIONS

(71) Applicant: AT&T Intellectual Property I, L.P., Atlanta, GA (US)

(72) Inventors: Mohammad Nikain, Atlanta, GA (US); Daniel Connolly, Suwanee, GA (US)

(73) Assignee: AT&T Intellectual Property 1, L.P., Atlanta, GA (US)

( * ) Notice: Subject to any disclaimer, the term of this patent is extended or adjusted under 35 U.S.C. 154(b) by 0 days.

(21) Appl. No.: 16/520,001

(22) Filed: Jul. 23, 2019

(65) Prior Publication Data

US 2020/0296005 A1  Sep. 17, 2020

Related U.S. Application Data

(63) Continuation-in-part of application No. 16/298,380, filed on Mar. 11, 2019.

(51) Int. Cl.
*H04L 12/24* (2006.01)
*G06F 9/455* (2018.01)

(52) U.S. Cl.
CPC .......... *H04L 41/14* (2013.01); *G06F 9/45558* (2013.01); *H04L 41/0893* (2013.01); *G06F 2009/45595* (2013.01)

(58) Field of Classification Search
CPC . H04L 41/0813; H04L 41/0896; H04L 69/04; H04L 41/0893; H04L 67/12;
(Continued)

(56) References Cited

U.S. PATENT DOCUMENTS 9,436,443 B2   9/2016  Chiosi et al.
9,672,502 B2   6/2017  Chaudhary et al.
(Continued)

FOREIGN PATENT DOCUMENTS

WO   WO 2017/162531 A1   9/2017
WO   WO 2018/171587 A1   9/2018

OTHER PUBLICATIONS

Masoumzadeh et al.; "Integrating VM selection criteria in distributed dynamic VM consolidation using Fuzzy Q-Learning"; Proceedings of the 9$^{th}$ Int'l Conf. on Network and Service Management; Oct. 2013; p. 332-338.

*Primary Examiner* — Tan Doan
(74) *Attorney, Agent, or Firm* — Guntin & Gust, PLC; Mark Wilinski

(57) ABSTRACT

Methods, systems and computer readable media for self-configuration of virtual network functions based on user intent are provided. A network having a plurality of virtual network functions each having a set of initial offering attributes is provided. An added virtual network function having a client and a set of added offering attribute is connected to a first virtual network function from the plurality of virtual network functions. Each initial set of offering attribute and the added offering attribute are advertised to each of the plurality of virtual network functions and the added virtual network function. An aggregate need of the client of the added virtual network function is determined and advertised. A second virtual network function from the plurality of virtual network functions is sought based on the aggregate need of the added virtual network function. The added virtual network function is connected to the second destination virtual network function.

20 Claims, 12 Drawing Sheets

(58) Field of Classification Search
CPC ............ H04L 41/5096; G06F 9/45558; G06F 2009/45595; G06F 2009/4557
USPC ........................................................ 719/220
See application file for complete search history.

(56) References Cited

U.S. PATENT DOCUMENTS

| | | |
|---|---|---|
| 10,120,710 B2 | 11/2018 | Kosugi et al. |
| 2016/0020962 A1 | 1/2016 | Carey et al. |
| 2016/0234082 A1* | 8/2016 | Xia ..................... H04L 41/5096 |
| 2016/0301579 A1* | 10/2016 | Djukic ................ H04L 41/5009 |
| 2017/0026235 A1* | 1/2017 | Famaey ................ H04L 47/827 |
| 2017/0111274 A1 | 4/2017 | Bays et al. |
| 2017/0214737 A1* | 7/2017 | Agarwal ............... H04L 69/326 |
| 2018/0034664 A1 | 2/2018 | Mulligan et al. |
| 2018/0227244 A1* | 8/2018 | Zhang ..................... H04L 45/42 |
| 2018/0316559 A1 | 11/2018 | Thulasi et al. |
| 2018/0316730 A1* | 11/2018 | Schaefer ............. H04L 41/0803 |
| 2018/0331960 A1 | 11/2018 | Browne et al. |
| 2018/0375726 A1 | 12/2018 | Xia |
| 2019/0044829 A1 | 2/2019 | Balzer et al. |

* cited by examiner

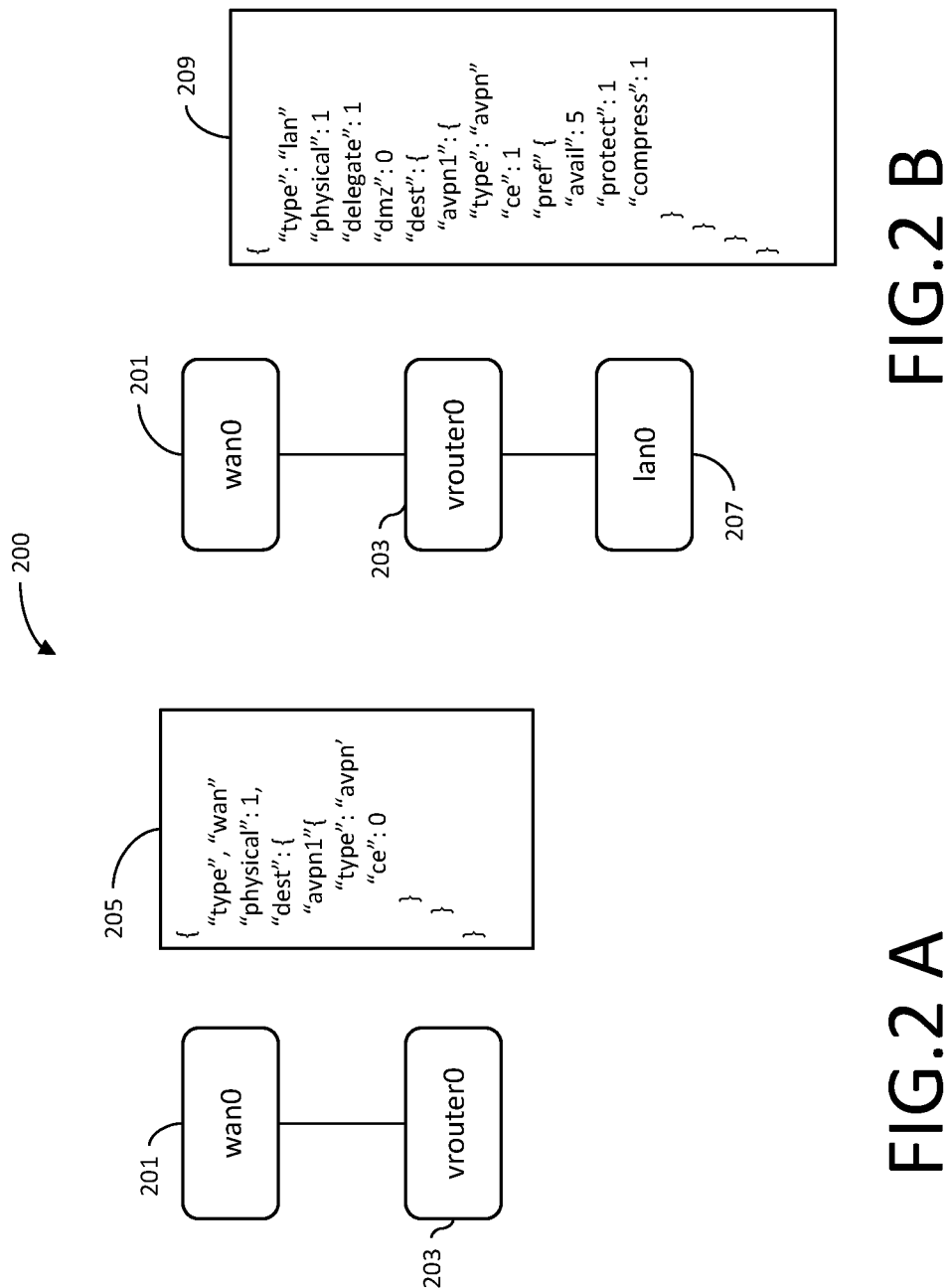

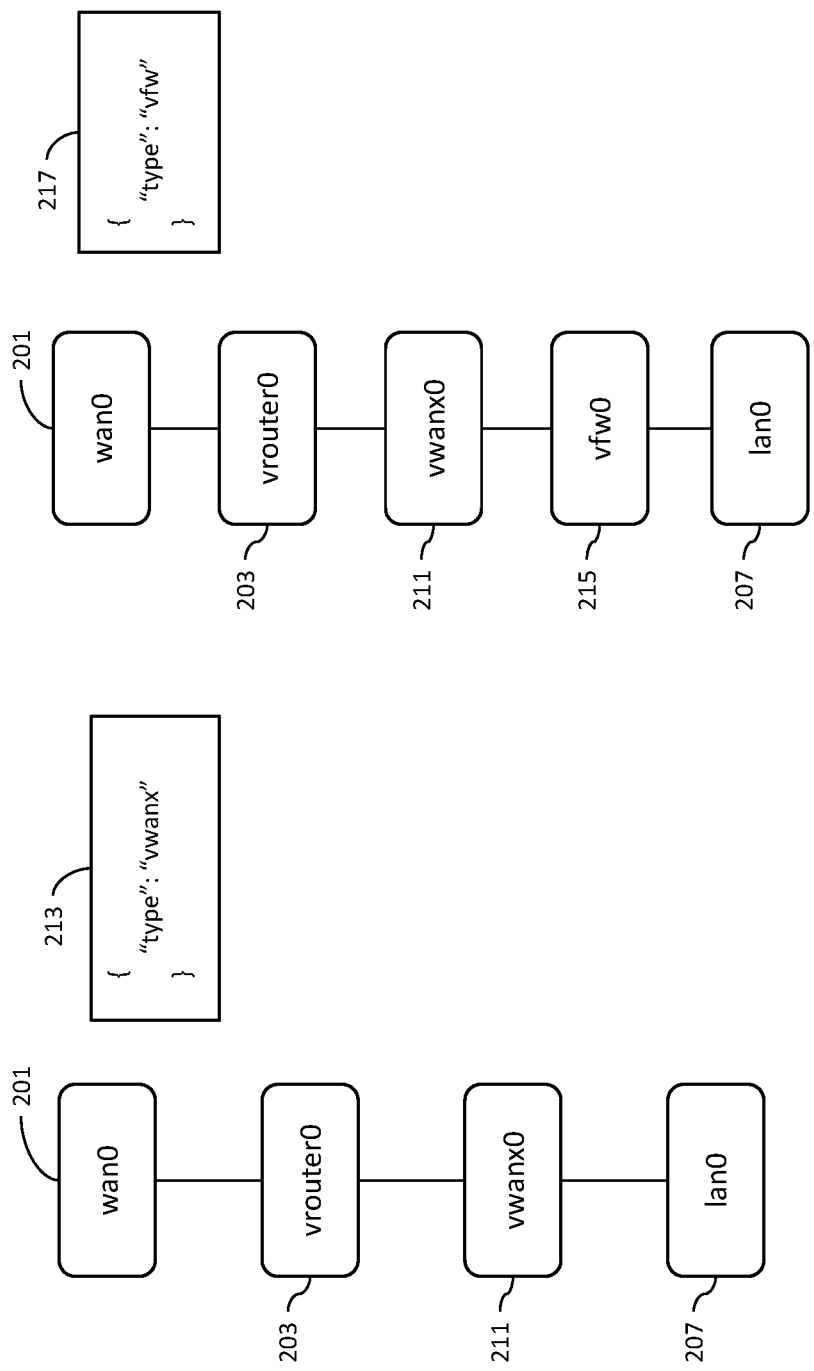

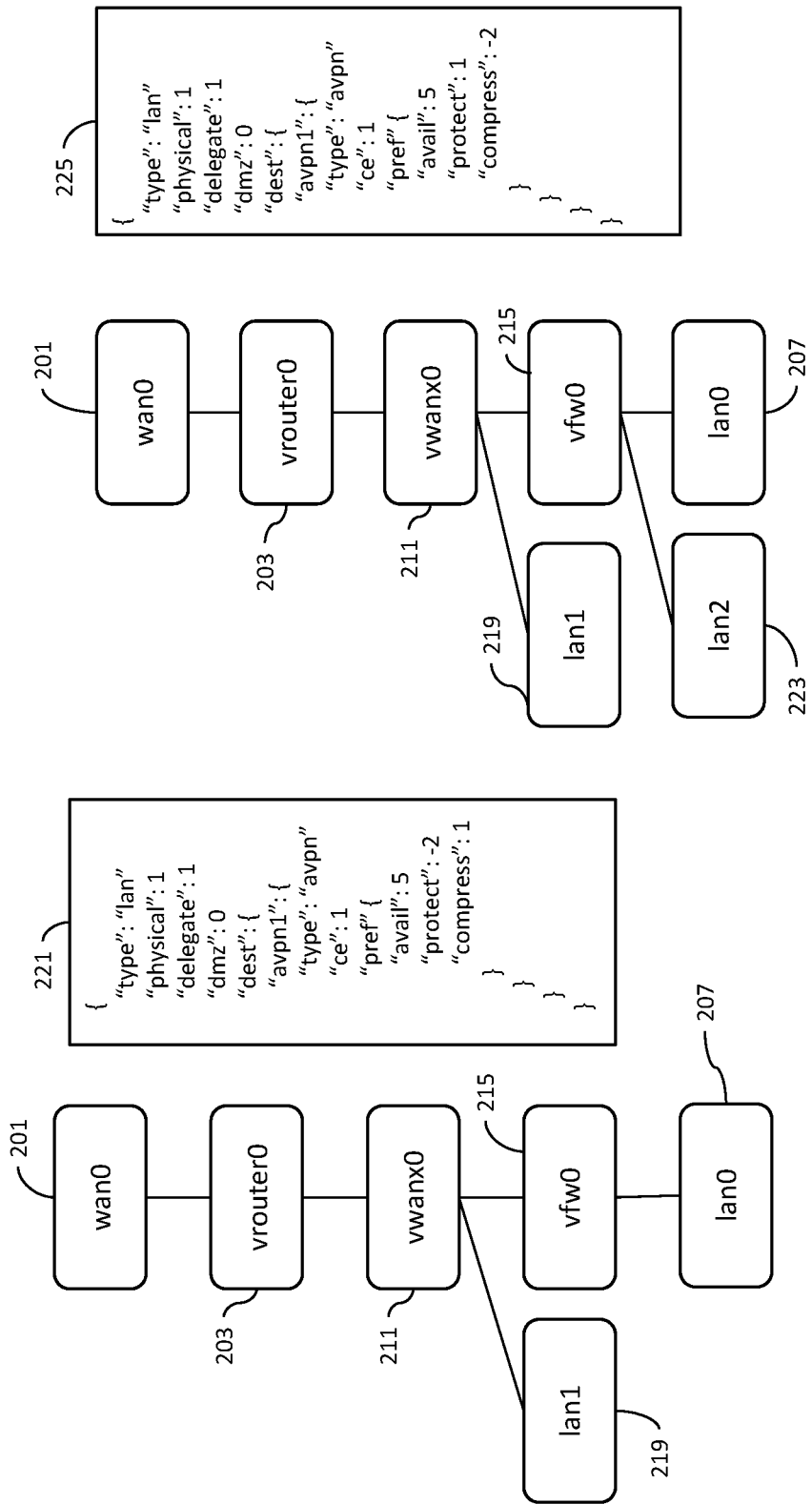

SYSTEMS AND METHODS FOR ENHANCED INTENT-BASED SELF CONFIGURATION OF VIRTUAL NETWORK FUNCTIONS

RELATED APPLICATIONS

This patent is a continuation-in-part of U.S. application Ser. No. 16/298,380 filed on Mar. 11, 2019 that is commonly assigned with the present application, and which application is hereby incorporated herein by this reference.

TECHNICAL FIELD

The present disclosure relates to the configuration of virtual network functions. More particularly, the disclosure relates to a method, system, and computer program for intent-based self-configuration of virtual network functions.

BACKGROUND

With the advent of software defined networks (SDN) and network function virtualization (NFV), network services providers may replace dedicated appliances with software virtual network functions (VNFs) running on a single, universal platform. Typically, the platform is a commercial off-the-shelf server hosting a mix of open source and proprietary software from a variety of vendors. Multi-purpose network devices (aka white boxes, universal CPE, etc. referred to collectively as uCPE here) are generic boxes with a standard operating system (usually Linux based) which can then be "loaded" with virtual network functions (VNFs) which are basically VMs (virtual machines) from potentially different vendors and provide functions such as routing, firewall, wan acceleration, bonding, etc. These VNFs need to be interconnected and configured to provide the overall client needed features (within the uCPE). Due to the growing number of VNFs and the multi-vendor nature of these VNFs, configuring the uCPE is very complicated. Currently, these configurations are handled through a set of supported templates, each handling a fixed potential configuration. If a change is required, then either a transition plan between two specific templates must be available or the device has to be reset and loaded with a new template (potentially requiring service interruptions and additional reconfigurations). As the number of VNFs grow, the number of potential templates grows exponentially to support different ways the VNFs could be interconnected and also adds numerous transition plans among templates. The complexity of supporting such a large number of templates and transition plans is already nearing a breaking point and is sure to get worse with additional VNFs entering the market and more complex needs being required by the clients.

SUMMARY

One general aspect includes a method including: providing in a network a first virtual network function having a first plurality of connected clients with a first set of needs and a first set of offering attributes. The method further includes providing a second virtual network function having a second plurality of connected clients with a second set of needs, and a second set of offering attributes. The method further includes providing a third virtual network function having a third plurality of connected clients with a third set of needs and a third set of offering attributes. And the method further includes providing an added virtual network function having a plurality of added clients with an added set of needs and a set of added offering attributes. The added virtual network function is connected to the first virtual network function and the first set of offering attributes, the second set of offering attributes, the third set of offering attributes and the set of added offering attributes are advertised to the first plurality of connected clients, the second plurality of connected clients, the third plurality of connected clients, and the plurality of added clients. The added set of needs is aggregated to create an aggregated set of added needs. The method further includes conveying the aggregated set of added needs to the first virtual network function; and combining, at the first virtual network function, the aggregated set of added needs, and the aggregated first set of needs to create a combined set of aggregate needs. A better destination is determined from among the second virtual network function and the third virtual network function based on the combined set of aggregate needs. Other embodiments of this aspect include corresponding computer systems, apparatus, and computer programs recorded on one or more computer storage devices, each configured to perform the actions of the methods.

Implementations may include one or more of the following features. The method where the first virtual network function, the second virtual network function, the third virtual network function and the added virtual networks function comprise a switching function, a traffic analysis function, a signaling function, an application level optimization function, a home router, a set top box, a mobile network node, a network-wide function, or a security function. The method where the first set of offering attributes, the second set of offering attributes, the third set of offering attributes and the set of added offering attributes correspond to one or more need attributes selected from a group including protection, compression, availability, cost, speed, service reliability, and quality of service. The method where the first set of offering attributes, the second set of offering attributes, the third set of offering attributes and the set of added offering attributes include weighted values. The method where the step of determining a better destination is based on the first set of offering attributes, the second set of offering attributes, the third set of offering attributes and the set of added offering attributes. The method further including connecting the first virtual network function to the better destination. The method where the first plurality of connected clients include a plurality of local area networks. Implementations of the described techniques may include hardware, a method or process, or computer software on a computer-accessible medium.

One general aspect includes a system comprising a network including a first virtual network function, having a first plurality of connected clients with a first set of needs, and a first set of offering attributes. The system also includes a second virtual network function having a second plurality of connected clients with a second set of needs, and a second set of offering attributes. The system also includes a third virtual network function having a third plurality of connected clients with a third set of needs and a third set of offering attributes. The system also includes an added virtual network function having a plurality of added clients with an added set of needs and a set of added offering attributes. The system also includes a memory for storing computer instructions and a processor coupled with the memory. The processor, responsive to executing the computer instructions, performs operations including connecting the added virtual network function to the first virtual network function. The system also includes computer instructions that perform operations including advertising the first set of offering attributes, the second set of offering attributes, the third set of offering attributes and the set of added offering attributes to the first plurality of connected clients, the second plurality of connected clients, the third plurality of connected clients, and the plurality of added clients. The system also includes computer instructions that perform operations including aggregating the added set of needs, to create an aggregated set of added needs. The system also includes computer instructions that perform operations including aggregating the first set of needs to create an aggregated first set of needs. The system also includes computer instructions that perform operations including conveying the aggregated set of added needs to the first virtual network function. The system also includes computer instructions the perform operations including combining, at the first virtual network function, the aggregated set of added needs, and the aggregated first set of needs to create a combined set of aggregate needs. The system also includes computer instructions that perform operations including determining a better destination from among the second virtual network function and the third virtual network function based on the combined set of aggregate needs. Other embodiments of this aspect include corresponding computer systems, apparatus, and computer programs recorded on one or more computer storage devices, each configured to perform the actions of the methods.

One general aspect includes a non-transitory computer readable storage medium having computer-executable instructions that, when executed, cause a computer system to provide in a network a first virtual network function having a first plurality of connected clients with a first set of needs, and a first set of offering attributes. The non-transitory computer readable storage medium also includes computer-executable instructions that, when executed, cause a computer system to provide a second virtual network function having a second plurality of connected clients with a second set of needs, and a second set of offering attributes. The non-transitory computer readable storage medium also includes computer-executable instructions that, when executed, cause a computer system to provide a third virtual network function having a third plurality of connected clients with a third set of needs and a third set of offering attributes. The non-transitory computer readable storage medium also includes computer-executable instructions that, when executed, cause a computer system to provide an added virtual network function having a plurality of added clients with an added set of needs and a set of added offering attributes; connect the added virtual network function to the first virtual network function; and advertise the first set of offering attributes, the second set of offering attributes, the third set of offering attributes and the set of added offering attributes to the first plurality of connected clients, the second plurality of connected clients, the third plurality of connected clients, and the plurality of added clients. The non-transitory computer readable storage medium also includes computer-executable instructions that, when executed, cause a computer system to aggregate the added set of needs, to create an aggregated set of added needs; aggregate the first set of needs to create an aggregated first set of needs; convey the aggregated set of added needs to the first virtual network function; combine, at the first virtual network function, the aggregated set of added needs, and the aggregated first set of needs to create a combined set of aggregate needs. The non-transitory computer readable storage medium also includes computer-executable instructions that, when executed, cause a computer system to and determine a better destination from among the second virtual network function and the third virtual network function based on the combined set of aggregate needs.

DETAILED DESCRIPTION OF ILLUSTRATIVE EMBODIMENTS

Figure 1:
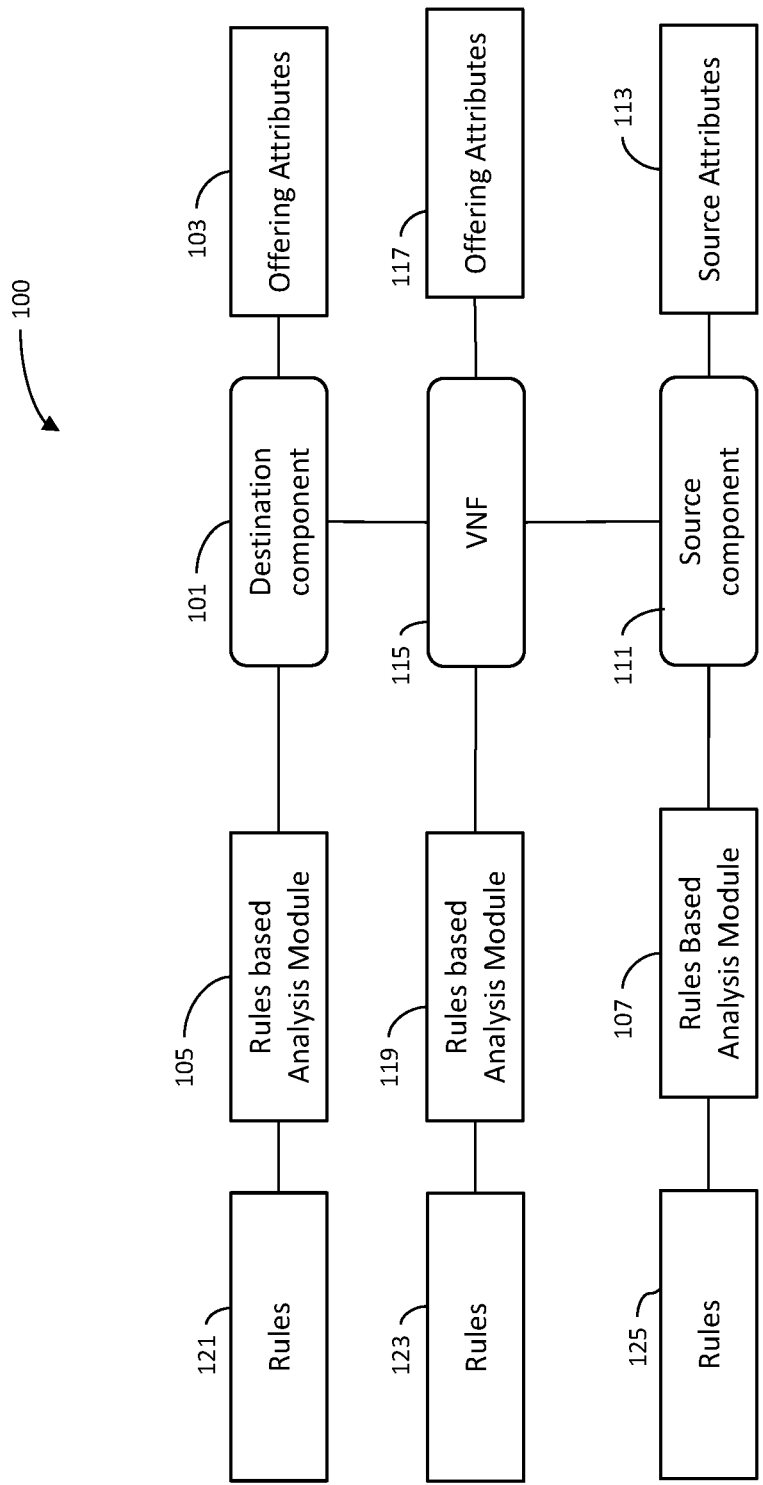
FIG. 1 is a block diagram for a system for intent-based self-configuration of virtual network functions.

Illustrated in FIG. 1 is a system 100 for intent-based self-configuration of virtual network functions. The system includes one or more destination components 101 (closely related to upstream/network ports e.g. a wide area network (WAN port). Associated with the destination components 101 are a set of offering attributes 103 and a rules-based analysis module 105. The offering attributes 103 identify the destination (e.g. Internet, enterprise network, etc.) or offerings. The system 100 also includes one or more source components 111 (closely related to downstream client-side ports e.g. local area networks (LANs) ports). Associated with the source component 111 are a set of source attributes 113 and a rules-based analysis module 107. The source attributes show the preferences for each destination and attribute of that destination (i.e. the customer intent, e.g. Internet plus protection) or needs. The attributes may include preferences for protection, costs, destination, speed, service, reliability etc. the attributes for both the offerings and needs are abstract in nature and can be defined uniquely for each installation and based on specific customer needs. Each of the source components 111 operates with an independent set of rules in the analysis module 107. The system 100 may include one or more virtual network functions (VNFs) 115. VNFs 115 may include elements that provide:

Switching functions: such as Broadband Network Gateway (BNG), Carrier-Grade Network Address Translation (CG-NAT), and routers;

Tunneling gateway functions: such as IP security (IPSec)/ Secure Sockets Layer (SSL), and virtual private network (VPN) gateways;

Traffic analysis functions: Deep packet inspection (DPI), Quality of Experience (QoE) measurements.

Signaling functions: Session Border Controllers (SBCs), IP Multimedia Subsystems (IMSs).

Application-level optimization function: Content Delivery Networks (CDNs), load Balancers, WAN accelerators.

Home routers and set top boxes.

Mobile network nodes: HLR/HSS, MME, SGSN, GGSN/ PDN-GW, RNC.

Network-wide functions: AAA servers policy control, charging platforms.

Security functions: firewalls, intrusion detection systems, virus scanners, spam protection.

A set of offering attributes 117 may be associated with VNFs 115. Additionally a rules-based analysis module 119 may be associated with the VNFs 115. The system 100 may be defined within a universal customer premises equipment (uCPE (not shown) which comprises VNFs running on a standard operating system hosted on an open server. The rules-based analysis modules 123 provides each VNF with the intelligence to analyze customer needs and autonomously assemble with other VNFs to provide a working solution that best meets customer needs. The system 100 provides the functionality of self-assembly into a working configuration without a central orchestrator/coordinator. Additionally, each VNF operates with an independent set of rules (rules 121, 122 and 123) (not impacted by changes to other VNF's or introduction of new VNF's). Finally, the system 100 utilizes fuzzy logic to produce the best solution, even if the solution does not meet all of the needs of the client (it will get it as close as possible using the assets available in the uCPE).

Figure 2:
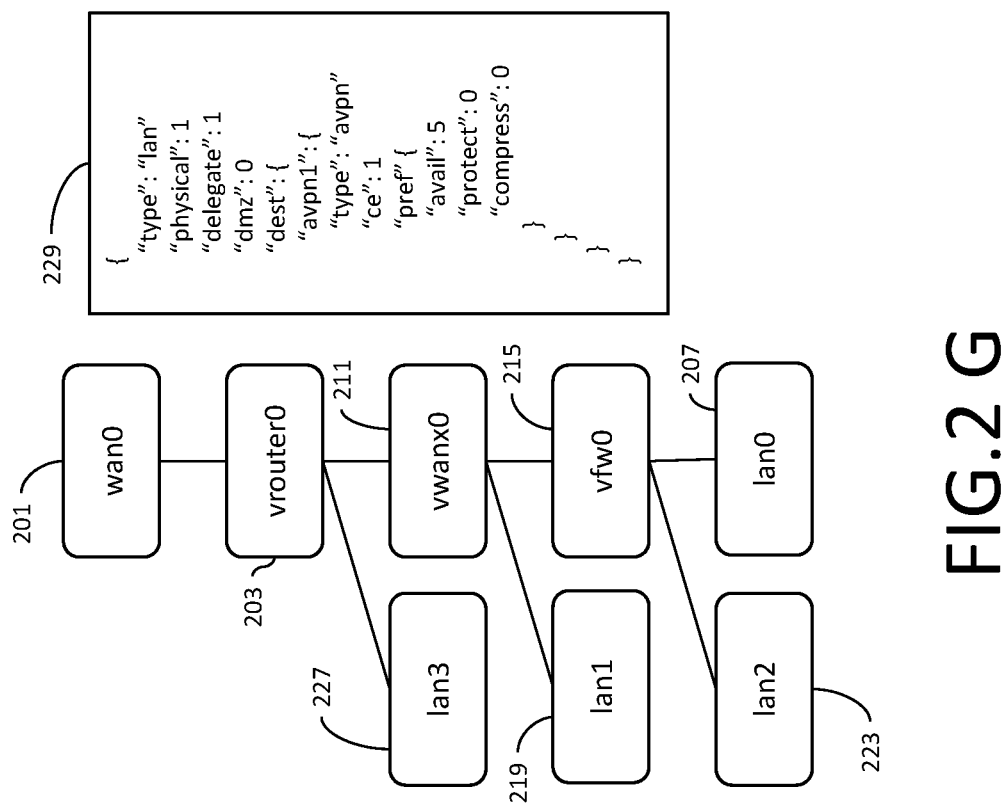
FIGS. 2A-2G are a set of block diagrams of an example of the operation of the system for intent-based self-configuration of virtual network functions.

Illustrated in FIG. 2A-2G is an example of the operation of the system 100. In FIG. 2A a WAN and a virtual Router (labeled vRouter0 203) are defined in the system. The code for the display of the WAN0 201 and the vRouter0 203 is illustrated in box 205. FIG. 2B illustrates what happens when a lan0 207 is added to the system 100. Code for the display of the lan0 is illustrated in box 209. In that case vrouter0 advertises the availability of the port in vrouter0 and the attributes of that port, in this case no attributes are advertised. and lan0 attaches to best available offering which is a port of vrouter0 203. FIG. 2C illustrates what happens when a WAN accelerator vwanx0 211 is added to the system. In that case vrouter0 203 is advertising the availability of a port without specific attributes. Next, vwanx0 211 will attach to the best available offering to connect to which is the offering from vrouter0 203 and makes an offering indicating the availability of compression. Code for the display of the addition of one accelerator vwanx0 211 is illustrated in box 213. FIG. 2D illustrates the addition of a virtual firewall vfw0 215. In this example no needs are specified for vfw0 215 and so it may attach to vwanx0 211. FIG. 2E illustrates what happens when a lan1 219 having specific needs attributes is introduced into the system. Code for the display of the addition of lan1 219 is illustrated in box 221. In this case lan1 219 has specific needs attributes of availability (availability factor of 5), protection (protection factor of −2), and compression (compression factor of 1). Upon introduction into the system 100, lan1 219 looks at the existing offerings to determine where to connect. The existing offerings are the offering of vrouter0 203 which has no protection and no compression, the offering of vwanx0 211 which has the attribute of compression, and the offering of vfw0 215 which has the attribute of protection. In this case, lan1 219 looks at the available offerings and selects the offering from vwanx0 because it offers the desired compression and does not select the offering from vfw0 215 because the protection attribute for lan1 219 indicates that protection is not important. FIG. 2F illustrates what happens when a third LAN, lan2 223 is added to the system. Code for the display of the addition of lan2 223 is shown in box 225. In this case the attributes are availability=5, protection=1 and compression=−2. This example illustrates that protection is relatively more important than compression (shown with a value of −2). In this case, lan2 223 looks at the available offerings and selects the offering from vfw0 215 as the best offering because it offers protection through the firewall. FIG. 2G illustrates what happens in the system 100 when lan3 227 is added to the system. Code for the display of the addition of lan3 227 is shown in box 229. In this case the attributes are availability equal to 5, protection equal to 0 and compression equal to 0. Again, lan3 227 looks at all the available offerings and selects the offering from vrouter0 203 because it does not offer protection or compression.

The decisions at the source and destination are based on rules contained in the source and destination. For example, when a destination (e.g. a WAN) is provided, the rules may require that the destination be provided with a router. When a source (e.g. a LAN) is added the rules at the source may require that the system determine if there is a better fit for connection of the source. When a VNF (e.g. a WAN accelerator) is added the rules may determine if there is a better fit for the source based on the attributes of the source and the modified offering from the added VNF.

Figure 3:
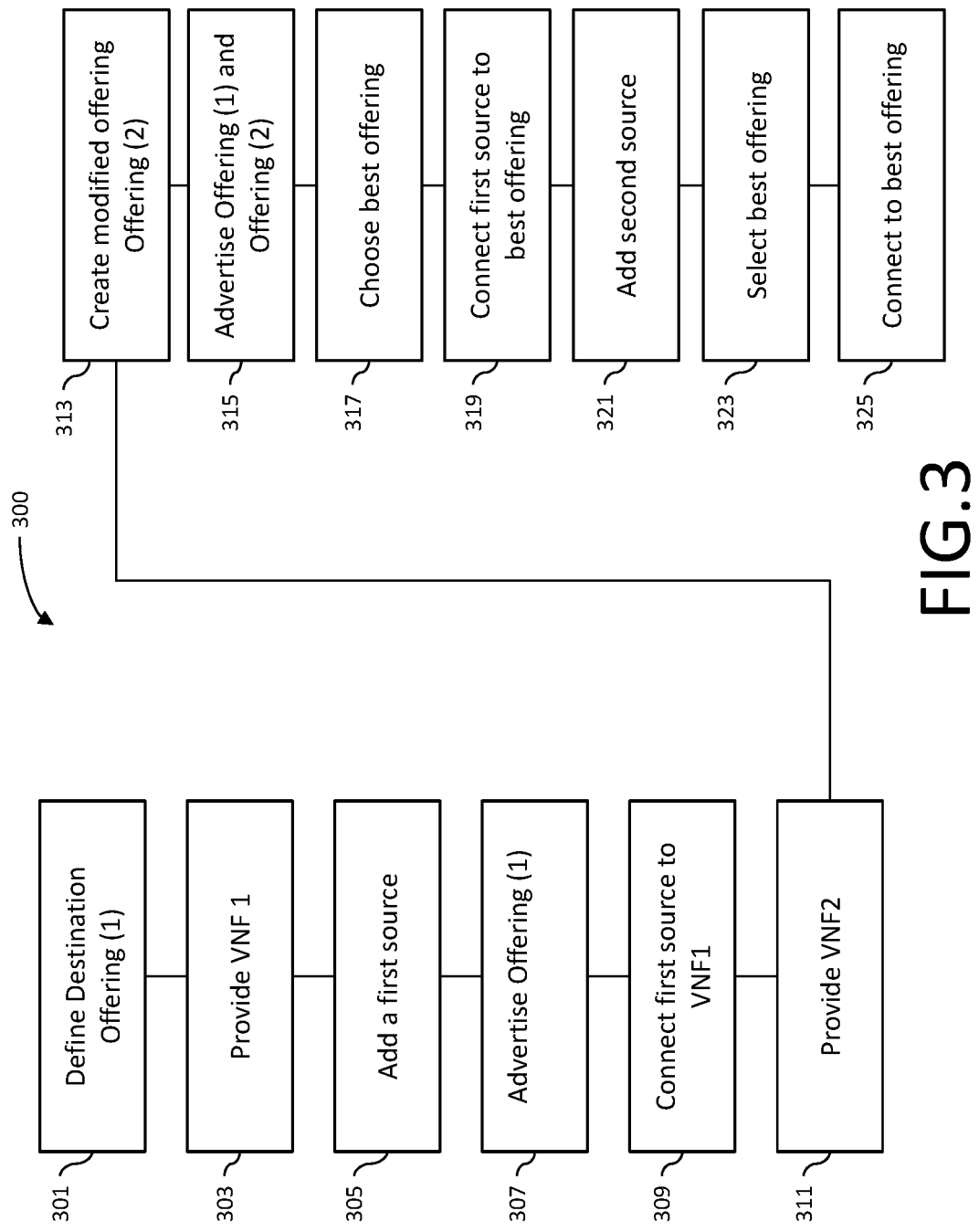
FIG. 3 is a flow chart of a method for intent-based self-configuration of virtual network functions.

FIG. 3 is a flowchart of a method 300 for intent based self-configuration of virtual network functions.

In step 301, the method 300 a destination with an initial offering (Offering (1)) is provided.

In step 303 a first VNF (VNF1) is provided capable of being connected to the destination.

In step 305, a first source (e.g. a LAN) is introduced into the system 100 and a first set of need attributes is defined by the user.

In step 307 VNF1 advertises the initial offering (Offering (1))

In step 309, the first source is connected to the destination.

In step 311 a second VNF (VNF 2) is provided. The second VNF may include a first added offering value (e.g. compression, protection, availability, cost, speed, service reliability, quality of service etc.).

In step 313 VNF2 may create a first modified offering with the first added offering value.

In step 315 VNF2 advertises the first modified offering with the first added offering value.

In step 317 first source will choose the best offering from the initial offering and the first modified offering. The choice will be based on the need attributes, and the offering attributes of the initial offering in the modified offering. For example, if the need attribute is protection, and VNF 2 is a firewall, and modified offering attribute would be protection, which would coincide with the need attribute of protection and VNF 2 would be selected as the best offering.

In step 319 the source would be connected to the VNF advertising the best offering.

In step 321, a second source may be added. The second source will have a set of second source attributes associated with the.

In step 323, the second source may select the best offering from among the initial offering in the first modified offering based on the offering attributes in the second source need attributes. For example, in the case where VNF 2 is a WAN accelerator, and the second source need attribute is compression, the best offering would be the offering from VNF 2 having the offering attribute of compression.

In step 325 the second source may connect to the best offering.

Figure 4:
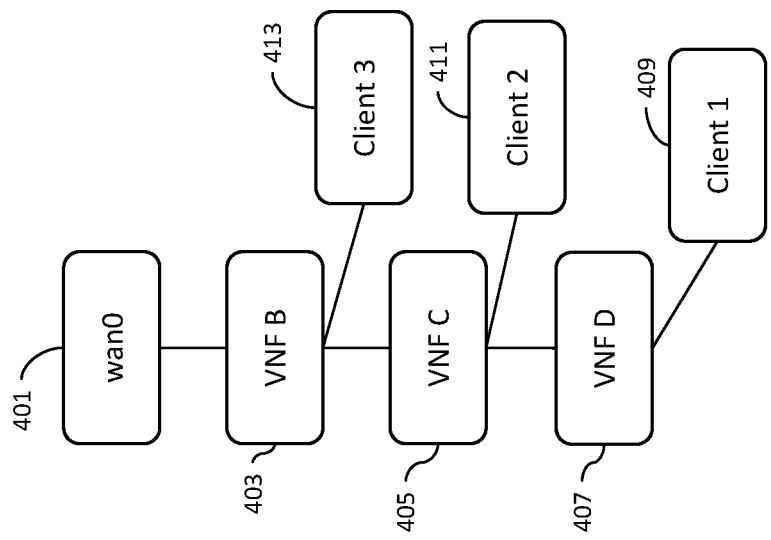
FIG. 4A-4F are a set of block diagrams of an example of the operation of the system for intent-based self-configuration of virtual network function with forward chaining of client needs.
Figure 4:
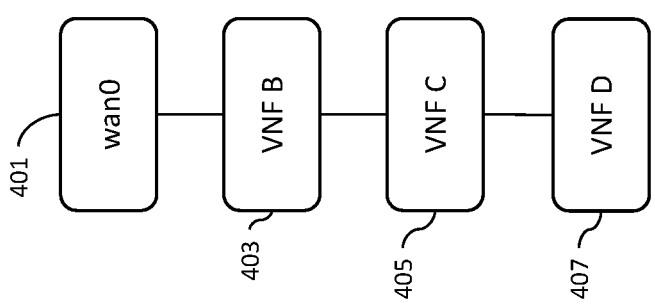
Figure 4:
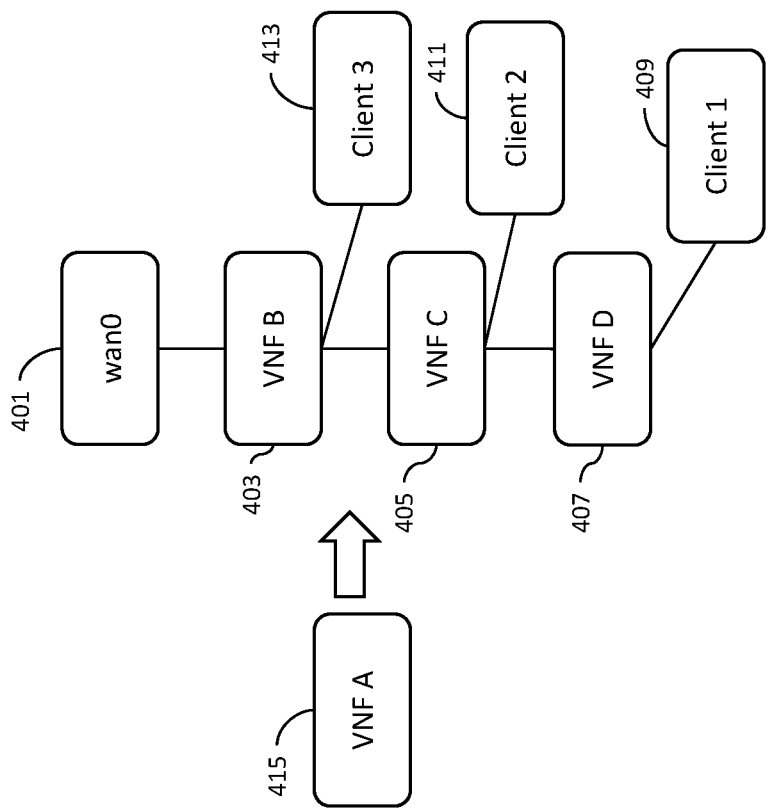
Figure 4:
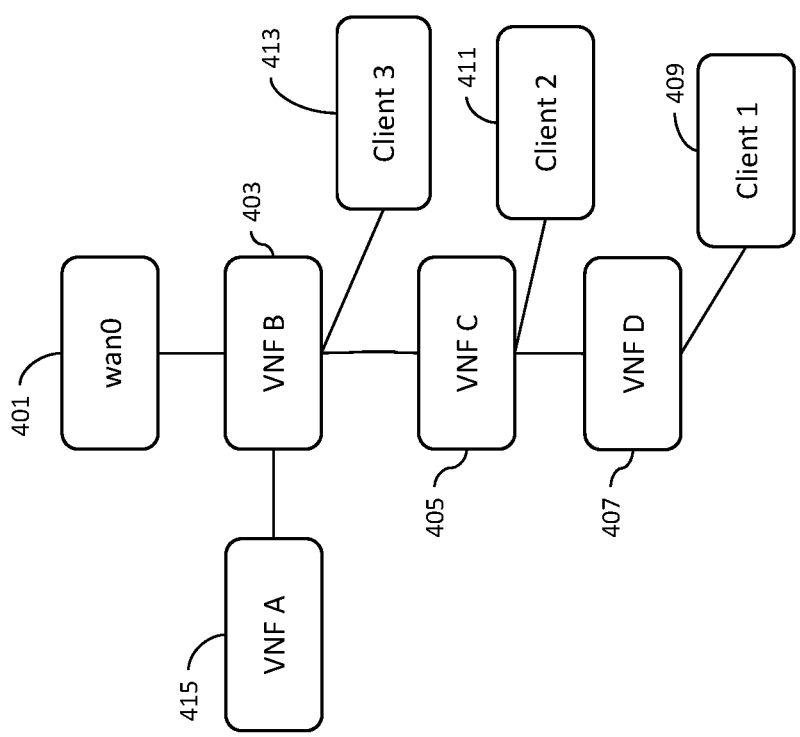
Figure 4:
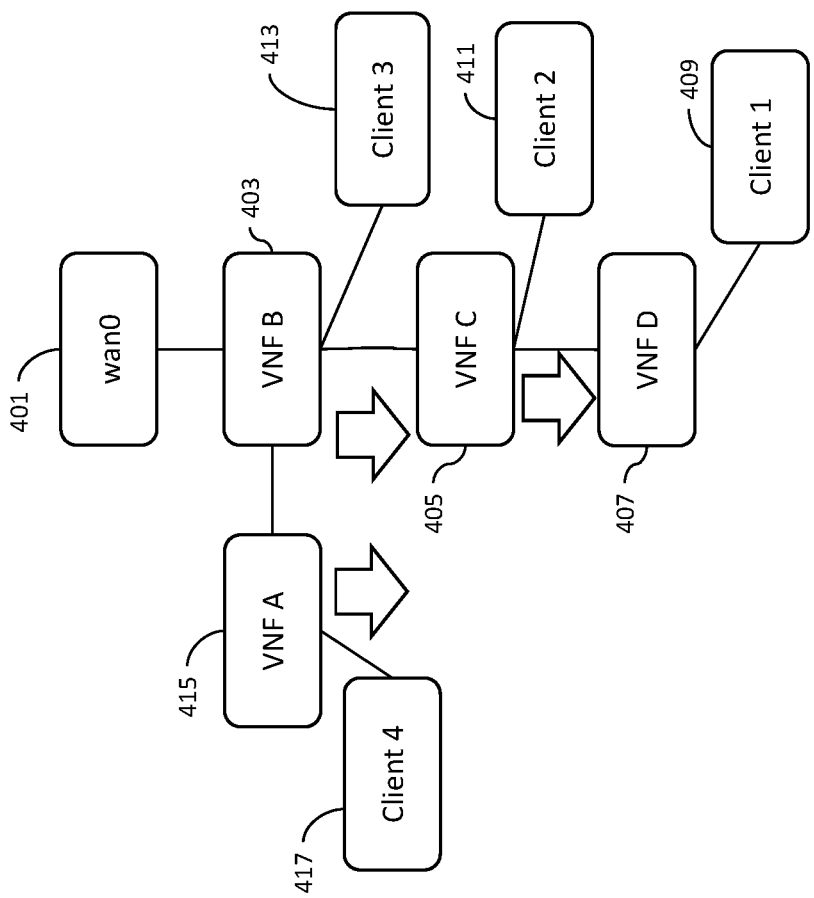

Illustrated in FIG. 4A is a system 400 including a first destination (destination 1 401) which may be a wide area network (wan0). The system 400 also includes a VNF B 403, a VNF C 405, and a VNF D 407, each with a set of attributes as described above.

As shown in FIG. 4B VNF D 407 may include client-1 409, VNF C 405 may include client-2 411 and client- and VNF B 403 may include client-3 413. Each client has a set of need attributes as described above. Although the illustration describes a single client attached to a VNF, it is contemplated that each VNF may have a plurality of clients attached.

FIG. 4C illustrates the introduction of a new VNF, in this case VNF A 415.

As illustrated in FIG. 4D, VNF A 415 may be connected to VNF B 403.

As shown in FIG. 4E, when the connection is made, each VNF advertises its offering of the attributes of the VNF to the clients of the other downstream (southbound) VNFs as described above.

Figure 4F:
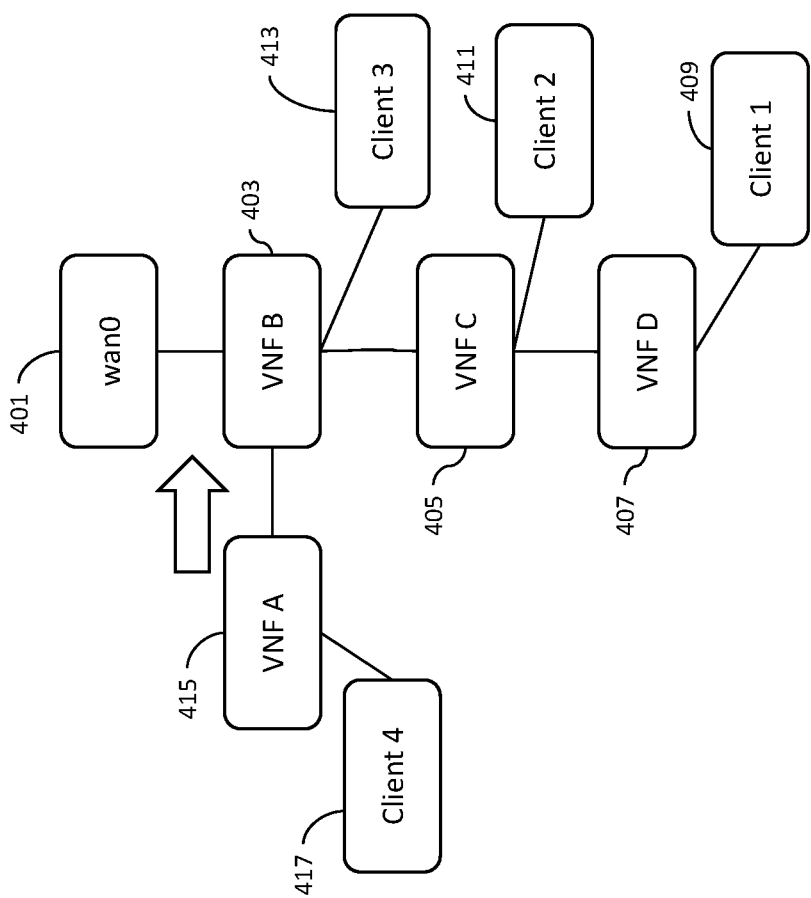

FIG. 4F illustrates an upstream (northbound) information flow that flows from the source (client) to the destination yielding better optimization. Once a VNF A 415 connects to a better destination (VNF B 403), VNF A 415 will also convey the aggregate needs of the clients of VNF A 417 (e.g. client 4 417) to the northbound VNF (VNF B 403). VNF B 403 will then combine this "aggregate need" with the "aggregate needs" of all of its other clients to create a set of combined aggregate needs and seeks a better potential destination.

If VNF B 403 finds a better destination, (e.g. VNF D 407), VNF B 403 will connect to the better destination (e.g. VNF D 407) else it will stay connected to its current destination (VNF C 405). However, in both cases, VNF B 403 will convey the newly calculated "aggregate need" to its destination VNF (VNF C 405 or VNF D 407 as the case may be). This may result in VNF C 405 or VNF D 407 to also reconnect (as they have a new "aggregate need" and hence may find a more suitable destination) and so on.

The net effect is that change in one client, now may affect VNF connections several times removed from the client and hence push optimizations deeper into the VNF network. This solution increases the "collective intelligence" of the VNFs as the VNFs now consider more configuration variations and can converge faster and more efficiently into an optimum solution. In some cases (especially when client needs are changing or conflicting) adding this northbound flow of information can enable the self-assembling VNFs to discover configurations not possible by the south-bound only version of the information flow (as the sequence of re-advertisements and reconnections would not converge on these cases).

Figure 5:
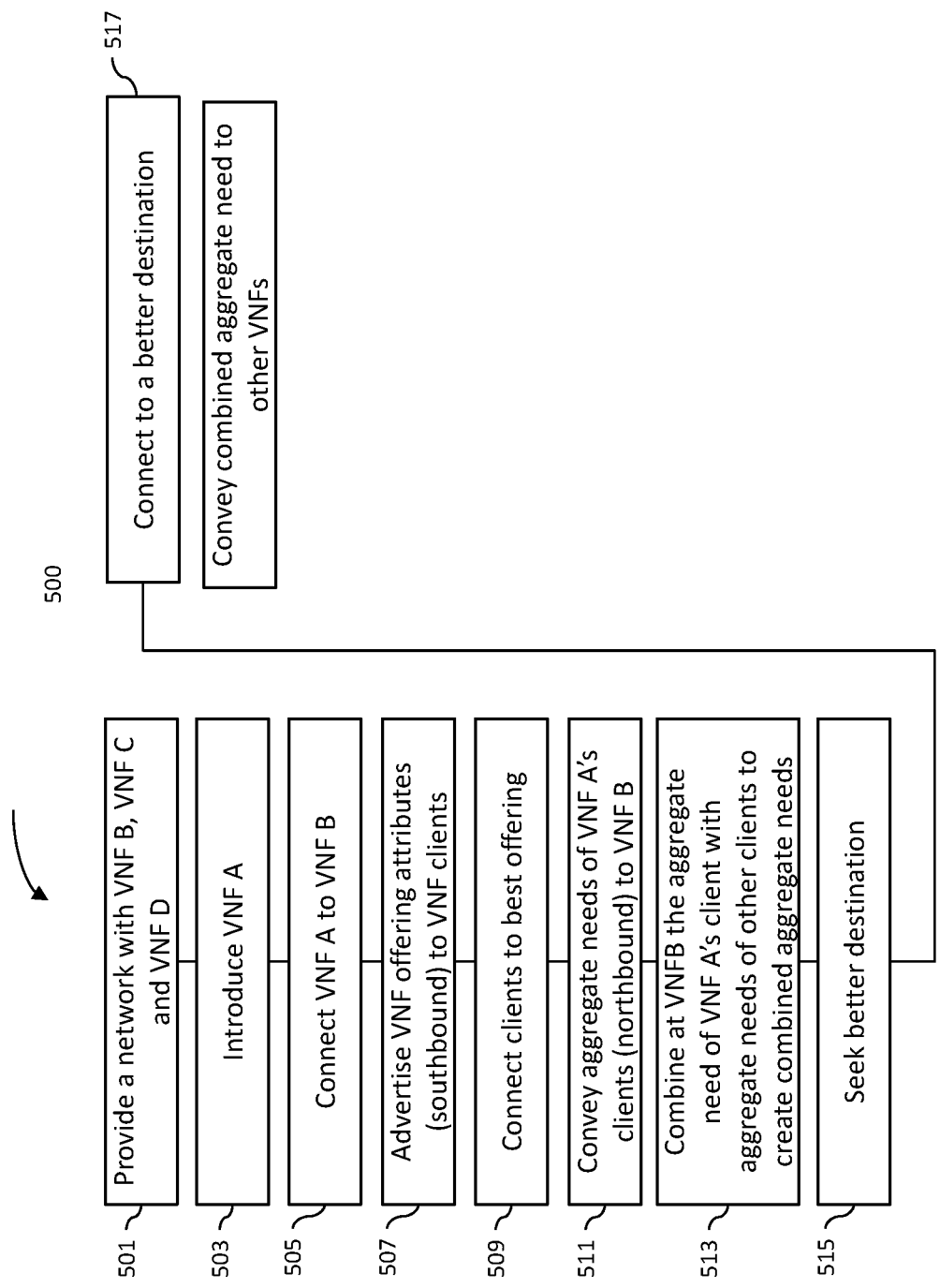
FIG. 5 is a flow chart of a method for intent-based self-configuration of virtual network functions with forward chaining of client needs.

FIG. 5 is a flowchart of an embodiment of a method 500 for intent-based self-configuration of virtual network functions with forward chaining of client needs.

In step 501, the method 500 provides a system with a plurality of VNFs (e.g. VNF B, VNF C and VNF D).

In step 503, the method 500 introduces (adds) an added VNF (e.g. VNF A) to the system.

In step 505, the method 500 connects the added VNF to one of the pluralities of VNFs in the system (e.g. VNF B).

In step 507, the method 500 advertises the offerings attributes of the plurality of VNFs and the added VNF (southbound) to the VNF clients in the system.

In step 509, the method 500 connects the VNF clients to the VNFs with the best offering.

In step 511, the method 500 conveys the aggregate needs of the clients of the added VNF (VNF A) northbound to the VNF to which the added VNF is connected (VNF B).

In step 513, the VNF to which the added VNF is connected (VNF B) aggregates needs of the clients of the added VNF (VNF A) with the aggregate needs of all other clients to create a combined aggregated need.

In step 515, the method 500 seeks a potential better destination for the VNF to which the added VNF is connected (VNF B).

In step 517, the method 500 connects the VNF to which the added VNF is connected (VNF B) to the best destination (e.g. VNF D).

An aspect of the disclosure is implemented as a program product for use with a computer system. Program(s) of the program product defines functions of embodiments and can be contained on a variety of machine-readable media, which include, but are not limited to: (i) information permanently stored on computer readable devices including non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the disclosure, represent embodiments of the disclosure.

While the foregoing is directed to embodiments of the present disclosure, other and further embodiments of the disclosure may be devised without departing from the basic scope thereof, and the scope thereof is determined by the claims that follow.

What is claimed:

1. A computer-implemented method comprising:
  connecting, by a device, an added virtual network function to a first virtual network function of a network, wherein the network comprises:
    the first virtual network function having a first plurality of connected clients with a first set of needs, and a first set of offering attributes, wherein the first set of offering attributes comprises an attribute of compression coupled with an attribute of protection,
    a second virtual network function having a second plurality of connected clients with a second set of needs, and a second set of offering attributes,
    a third virtual network function having a third plurality of connected clients with a third set of needs and a third set of offering attributes,
    the added virtual network function having a plurality of added clients with an added set of needs and a set of added offering attributes;
  advertising, by the device, the first set of offering attributes, the second set of offering attributes, the third set of offering attributes and the set of added offering attributes to the first plurality of connected clients, the second plurality of connected clients, the third plurality of connected clients, and the plurality of added clients;
  aggregating the added set of needs of the plurality of added clients to create an aggregated set of added needs;
  aggregating the first set of needs of the first plurality of connected clients to create an aggregated first set of needs;
  conveying the aggregated set of added needs to the first virtual network function;
  combining, at the first virtual network function, the aggregated set of added needs and the aggregated first set of needs to create a combined set of aggregate needs;
  based on the combined set of aggregate needs, determining a destination for communications from the plurality of added clients or the first plurality of connected clients by matching the combined set of aggregate needs to the second set of offering attributes or the third set of offering attributes, wherein the destination comprises the second virtual network function or the third virtual network function; and communicating with the destination.

2. The method of claim 1 wherein the first virtual network function, the second virtual network function, the third virtual network function and the added virtual network function comprises a mobile network node.

3. The method of claim 1 wherein the first set of offering attributes, the second set of offering attributes, the third set of offering attributes and the set of added offering attributes correspond to one or more need attributes comprising quality of service.

4. The method of claim 1 wherein the first set of offering attributes, the second set of offering attributes, the third set of offering attributes and the set of added offering attributes comprise weighted values.

5. The method of claim 1 wherein the step of determining a destination is based on the first set of offering attributes, the second set of offering attributes, the third set of offering attributes and the set of added offering attributes.

6. The method of claim 1 further comprising connecting the first virtual network function to the destination.

7. The method of claim 1 wherein the first plurality of connected clients comprises a plurality of local area networks.

8. A system comprising:
a network comprising:
a first virtual network function, having a first plurality of connected clients with a first set of needs, and a first set of offering attributes, wherein the first set of offfering attributes comprises an attribute of compression coupled with an attribute of protection;
a second virtual network function having a second plurality of connected clients with a second set of needs, and a second set of offering attributes;
a third virtual network function having a third plurality of connected clients with a third set of needs and a third set of offering attributes; and
an added virtual network function having a plurality of added clients with an added set of needs and a set of added offering attributes;
a memory for storing computer instructions;
a processor coupled with the memory, wherein the processor, responsive to executing the computer instructions, performs operations comprising:
connecting the added virtual network function to the first virtual network function;
advertising the first set of offering attributes, the second set of offering attributes, the third set of offering attributes and the set of added offering attributes to the first plurality of connected clients, the second plurality of connected clients, the third plurality of connected clients, and the plurality of added clients;
aggregating the added set of needs of the plurality of added clients to create an aggregated set of added needs;
aggregating the first set of needs of the first plurality of connected clients to create an aggregated first set of needs;
conveying the aggregated set of added needs to the first virtual network function;
combining, at the first virtual network function, the aggregated set of added needs and the aggregated first set of needs to create a combined set of aggregate needs;

based on the combined set of aggregate needs, determining a destination for communications from the plurality of added clients or the first plurality of connected clients by matching the combined set of aggregate needs to the second set of offering attributes or the third set of offering attributes, wherein the destination comprises the second virtual network function or the third virtual network function; and communicating with the destination.

9. The system of claim 8 wherein the first virtual network function, the second virtual network function, the third virtual network function and the added virtual network function comprise a security function.

10. The system of claim 8 wherein the first set of offering attributes, the second set of offering attributes, the third set of offering attributes and the set of added offering attributes comprise one or more need attributes comprising speed.

11. The system of claim 8 wherein the first set of offering attributes, the second set of offering attributes, the third set of offering attributes and the set of added offering attributes comprise weighted values.

12. The system of claim 8, wherein the computer instructions perform operations further comprising determining a better destination is based on the first set of offering attributes, the second set of offering attributes, the third set of offering attributes and the set of added offering attributes.

13. The system of claim 12 wherein the computer instructions perform operations further comprising connecting the first virtual network function to the better destination.

14. The system of claim 8 wherein the first plurality of connected clients comprises a plurality of local area networks.

15. A non-transitory computer readable storage medium having computer-executable instructions that, when executed, cause a computer system to:
connect an added virtual network function to a first virtual network function of a network, wherein the network comprises:
the first virtual network function having a first plurality of connected clients with a first set of needs, and a first set of offering attributes, wherein the first set of offering attributes comprises an attribute of compression coupled with an attribute of protection,
a second virtual network function having a second plurality of connected clients with a second set of needs, and a second set of offering attributes,
a third virtual network function having a third plurality of connected clients with a third set of needs and a third set of offering attributes,
the added virtual network function having a plurality of added clients with an added set of needs and a set of added offering attributes;
advertise the first set of offering attributes, the second set of offering attributes, the third set of offering attributes and the set of added offering attributes to the first plurality of connected clients, the second plurality of connected clients, the third plurality of connected clients, and the plurality of added clients;
aggregate the added set of needs of the plurality of added clients to create an aggregated set of added needs;
aggregate the first set of needs of the first plurality of connected clients to create an aggregated first set of needs;
convey the aggregated set of added needs to the first virtual network function;

combine, at the first virtual network function, the aggregated set of added needs and the aggregated first set of needs to create a combined set of aggregate needs;

based on the combined set of aggregate needs, determine a destination for communications from the plurality of added clients or the first plurality of connected clients by matching the combined set of aggregate needs to the second set of offering attributes or the third set of offering attributes, wherein the destination comprises the second virtual network function or the third virtual network function; and communicate with the destination.

16. The non-transitory computer readable storage medium of claim 15 wherein the first virtual network function, the second virtual network function, the third virtual network function and the added virtual network function comprises a switching function, a traffic analysis function, a signaling function, an application level optimization function, a home router, a set top box, a mobile network node, a network-wide function, or a security function.

17. The non-transitory computer readable storage medium of claim 15 wherein the first set of offering attributes, the second set of offering attributes, the third set of offering attributes and the set of added offering attributes correspond to one or more need attributes comprising cost.

18. The non-transitory computer readable storage medium of claim 15 wherein the first set of offering attributes, the second set of offering attributes, the third set of offering attributes and the set of added offering attributes comprise weighted values.

19. The non-transitory computer readable storage medium of claim 15 wherein determining a better destination is based on the first set of offering attributes, the second set of offering attributes, the third set of offering attributes and the set of added offering attributes.

20. The non-transitory computer readable storage medium of claim 19 wherein the computer-executable instructions further comprise instructions to connect the first virtual network function to the better destination.

* * * * *